United States Patent [19]

Stokes

[11] 4,375,494
[45] Mar. 1, 1983

[54] POLYESTER FILM COMPOSITES

[75] Inventor: Richard M. Stokes, Welwyn Garden City, England

[73] Assignee: Imperial Chemical Industries PLC, London, England

[21] Appl. No.: 237,265

[22] Filed: Feb. 23, 1981

[30] Foreign Application Priority Data

Mar. 12, 1980 [GB] United Kingdom ............... 8008394

[51] Int. Cl.$^3$ ................... B32B 5/16; B32B 27/36
[52] U.S. Cl. ................... 428/323; 428/480; 428/910
[58] Field of Search ............ 428/480, 323, 910

[56] References Cited

U.S. PATENT DOCUMENTS

| | | | |
|---|---|---|---|
| 3,154,461 | 10/1964 | Johnson | 428/306 |
| 3,980,611 | 9/1976 | Anderson et al. | 260/40 R |
| 4,198,458 | 4/1980 | Mitsuishi et al. | 428/480 |
| 4,274,025 | 6/1981 | Nerurkar et al. | 428/480 |

FOREIGN PATENT DOCUMENTS

| | | |
|---|---|---|
| 51-8387 | 1/1976 | Japan . |
| 1096064 | 12/1967 | United Kingdom . |
| 1115004 | 5/1968 | United Kingdom . |
| 1115007 | 5/1968 | United Kingdom . |
| 1337331 | 11/1973 | United Kingdom . |
| 1372811 | 11/1974 | United Kingdom . |
| 1459810 | 12/1976 | United Kingdom . |
| 1465973 | 3/1977 | United Kingdom . |
| 1473847 | 5/1977 | United Kingdom . |
| 1547241 | 6/1979 | United Kingdom . |
| 1591582 | 6/1981 | United Kingdom . |

*Primary Examiner*—William J. Van Balen
*Attorney, Agent, or Firm*—Cushman, Darby & Cushman

[57] ABSTRACT

A polyester film composite has a primary layer comprising an oriented layer of a first linear polyester and a heat-sealable secondary layer adherent to the primary layer and comprising an essentially amorphous second linear polyester, said secondary layer containing from 0.005 to 10% by weight based upon the weight of the second linear polyester of a finely-divided particulate additive having an average particle size greater than the thickness of the secondary layer dispersed substantially uniformly throughout the secondary layer, the exposed surface of the secondary layer having anti-blocking properties produced by surface protrusions in an area concentration of at least 50 protrusion peaks per mm$^2$ of surface having a peak height of at least 0.5 μm measured from the surface of the polymer. The particulate additive preferably has an average particle size less than 30 μm. The secondary layer preferably also contains 0.1 to 1% by weight of smaller particles having an average particle size of 0.005 to 1.8 μm.

6 Claims, No Drawings

POLYESTER FILM COMPOSITES

The present invention relates to polyester film composites, processes for their production and metallised films produced from the composite films.

Polyester film composites comprising a layer of transparent polyethylene terephthalate and a layer of a transparent copolyester are described in GB patent specification No. 1,465,973. The copolyester layer has an embossed exposed surface which is receptive to marking by writing or alternatively is in the form of a decorative design.

It is also known that thermoplastics films often have poor handling properties which may result in difficulties in winding the films into reels and inefficient passage through processing machines. Many proposals have been made for overcoming these difficulties, for example the addition of filler particles especially of inorganic materials to the film. It has been proposed, for example, to include particles in the film having a size smaller than the thickness of the film to form surface protuberances in the film.

According to the present invention a polyester film composite comprises a primary layer comprising a highly crystalline molecularly oriented layer of a first linear polyester and a heat-sealable secondary layer adherent to the primary layer and comprising an essentially amorphous second linear polyester, said secondary layer containing from 0.005 to 10% by weight based upon the weight of the second linear polyester of a finely-divided particulate additive having an average particle size greater than the thickness of the secondary layer and dispersed substantially uniformly throughout the secondary layer, the exposed surface of the secondary layer having anti-blocking surface protrusions produced by the particulate additive, said surface protrusions being present in an area concentration of at least 50 protrusion peaks per mm² of surface having a peak height of at least 0.4 μm measured from the surface of the polymer, i.e. the mean level of the bases of the troughs between the dispersed particles. The secondary layer should be capable of forming a heat-seal bond to itself or to the primary layer, or preferably to both, by heating to soften the second linear polyester and applying pressure without softening or melting the first linear polyester in the primary layer.

The polyester film composite may be formed by solvent casting or extrusion of the secondary layer onto the surface of a self-supporting film of the first linear polyester, preferably a biaxially oriented and heat-set film of polyethylene terephthalate. A convenient and alternative process for the manufacture of such film composites includes multiple extrusion through a multiple orifice die or coextrusion of the composite layers, e.g. broadly as described in GB patent specification No. 1,465,973, followed by molecular orientation by stretching in one or more directions and heat setting. A convenient process and apparatus for coextrusion, known as a single channel coextrusion, which is described in GB patent specification Nos. 1,115,004 and 1,115,007, comprises simultaneously extruding streams of the first and second polyesters from two different extruders, uniting the two streams of polyesters in a tube leading to a manifold of an extrusion die and extruding the two polyesters together through the die under conditions of streamline flow so that the two polyesters occupy distinct regions of the flow without intermixing whereby a composite is produced.

The primary layer of the film composite may be produced from any suitable synthetic linear polyester which may be obtained in highly crystalline form after stretching and heat setting. Polyethylene terephthalate primary layers are particularly preferred. Biaxial orientation of the primary layer such as a polyethylene terephthalate layer may be accomplished by stretching the film composite in sequence in two matually perpendicular directions typically at temperatures in the range 78° to 125° C. The stretching operation is preferably followed by heat setting under dimensional restraint typically at a temperature in the range 150° to 250° C. Convenient processes for stretching and heat setting are described in GB patent specification No. 838,708.

The second linear polyester of the secondary layer is preferably a copolyester derived from one or more of terephthalic acid, isophthalic acid and hexahydroterephthalic acid and one or more glycols, preferably ethylene glycol. The preferred copolyesters which provide satisfactory heat-sealing properties in the amorphous state are those of ethylene terephthalate and ethylene isophthalate, especially in the molar ratios 60 to 90 mole % ethylene terephthalate and correspondingly 40 to 10 mole % ethylene isophthalate. Particularly preferred copolyesters comprise 70 to 85 mole % ethylene terephthalate and 30 to 15 mole % ethylene isophthalate, e.g. a copolyester of approximately 80 mole % ethylene terephthalate and approximately 20 mole % ethylene isophthalate.

According to the invention, a preferred process for the production of a polyester film composite comprises forming a film composite which includes a primary layer comprising a first linear polyester and a heat-sealable secondary layer adherent to the primary layer and comprising an essentially amorphous second linear polyester, said secondary layer containing from 0.005 to 10% by weight based upon the weight of the second linear polyester of a finely-divided particulate additive dispersed substantially uniformly throughout the secondary layer, and molecularly orienting the primary layer by stretching the film composite in at least one direction and then heat setting the primary layer, wherein the finely-divided particulate additive in the secondary layer has an average particle size of less than 30 μm but exceeding the thickness of the secondary layer after the film composite has been stretched. For example, the primary and secondary layers may be extruded through a multiple orifice die and united in the molten state after extrusion or alternatively the composite film may be formed by coextrusion generally as described in GB patent specification Nos. 1,115,004, 1,115,007 and 1,465,973. The composite film is preferably heat-set under dimensional restraint after the stretching operation has been completed. Generally, the conditions applied for stretching the primary layer may function to partially crystallise the second linear polyester and in such cases it is preferred to heat set under dimensional restraint at a temperature greater than the crystalline melting temperature of the second linear polyester and permit or cause the composite to cool in order to render the second linear polyester essentially amorphous.

Secondary layers may be disposed on one or both sides of the primary layer. The film composites may have a total thickness in the range 10 to 500 μm and the or each secondary layers preferably constitute from 1 to 25% of the total composite thickness. The secondary layers preferably have a thickness of up to 10 μm and most preferably up to 5 μm.

Adequate anti-blocking properties are achieved when the protrusion peaks in the secondary layer are less than 5 μm in height. In a preferred embodiment all of the peak heights are in the range 1 to 3 μm, desirably in a surface concentration of up to 150 peaks per mm² of surface.

In the case of spherical particulate additives the average size of the particles is determined as the diameter of the particles. However, many particulate additives, especially inorganic particles, are non-spherical in shape and for the purposes of this specification their average size is determined as the size of the particles in their greatest dimension. Size determination may be achieved by any process known in the art, e.g. by means of electron microscopy or sedimentation analysis.

It has been observed in the art that some particulate additives agglomerate into larger particles when added to polymeric materials or the reactants for their formation. According to the preferred process described above for the production of the polyester film composites, the particulate additive has an average particle size less than 30 μm, and it is intended that this particle size should apply to the size of the primary non-agglomerated particles. Preferably the added particles have an average primary particle size (conveniently ascertained as the median particle size by weight) in the range 2 to 10 μm.

Desirably the particles of the added particulate material have a size distribution whereby the size of 10% by weight of the particles (i.e. the upper decile) exceeds 5 μm.

The particulate additive should be chemically inert in relation to the second linear polyester and the materials from which it is produced or any other additives in the secondary layer and preferably comprises inorganic particles comprising one or a mixture of natural or synthetic silica, glass beads, calcium borate, calcium carbonate, magnesium carbonate, barium sulphate, calcium silicate, calcium phosphate, aluminium trihydrate, alumino silicates including the hydrated and calcined forms thereof, and titanium dioxide. Other suitable particulate additives include polymeric particles of polymers which melt at a temperature higher than the highest temperatures used in the production of the film composite and/or are immiscible with the second linear polyester. The preferred particulate additive comprises particles of silica.

Ideally, the added particles are substantially spherical in shape.

The particulate additive is preferably included in the secondary layer in an amount up to 5% by weight based upon the weight of the second linear polyester. In general, satisfactory surface slip and anti-blocking properties are provided by amounts of the particulate additive up to 1% by weight and especially in the range 0.01 to 0.5% by weight.

In a film composite typically having a secondary layer thickness in the range 2 to 4 μm, spherical silica particles having a primary average particle size in the range 3 to 8 μm, and a size distribution in which the size of 10% by weight of the particles exceeds 5 μm, present in the secondary layer in an amount in the range 0.1 to 0.5% by weight based upon the weight of the second linear polyester, result in a surface concentration of protrusion peaks projecting from the surface of the secondary layer in the range 25 to 150 per mm² and having a peak height in the range 1 to 3 μm. Such a surface provides excellent handling properties and acceptable heat-sealing properties in film composites comprising a biaxially oriented and heat-set polyethylene terephthalate primary layer and a 70 to 85 mole % ethylene terephthalate/30 to 15 mole % ethylene isophthalate copolyester secondary layer represented by a static coefficient of friction for the secondary layer tested against itself in the range 0.40 to 0.50 and a heat-seal strength measured by sealing the secondary layer to itself in the range 40 to 70 N/mm².

The film composites according to the present invention are suitable for heat sealing to themselves or the surfaces of other films such as polyethylene terephthalate films using conventional heat-sealing apparatus and conditions whereby the seal is formed by heating the film composite to a temperature at which the essentially amorphous secondary layer is softened and bonded to the receptive surface. Secondary layers comprising a 70 to 85 mole % ethylene terephthalate/30 to 15 mole % ethylene isophthalate copolyester are particularly suitable for heat sealing. The film composites also have acceptable handling properties determined by surface friction and blocking tests upon the secondary layers.

The heat-sealable films described above are useful for the packaging of the wide range of articles. However, it is generally desirable that packaging films should have excellent optical clarity combined with other desirable properties such as good handling properties such that the films can be passed efficiently and without interruption through packaging machines, for example anti-blocking properties and slip properties or a low coefficient of friction. Particulate additives used to modify the handling properties can, however, adversely influence optical clarity and heat-sealing properties.

According to a particularly preferred embodiment of the invention, the secondary layer of the film composite comprises an admixture of finely-divided particles which includes particles of the nature and present in the amount described above together with smaller particles having an average particle size in the range 0.005 to 1.8 μm and present in an amount of 0.1 to 1% by weight based on the weight of the second linear polyester. Such film composites provide a particularly useful combination of optical clarity, handling and heat-sealing properties.

Therefore, according to this preferred embodiment of the invention, a polyester film composite comprises a primary layer comprising a highly crystalline molecularly oriented layer of a first linear polyester and a heat-sealable secondary layer adherent to the primary layer and comprising an essentially amorphous second linear polyester, said secondary layer containing from 0.005 to 0.2% by weight based upon the weight of the second linear polyester of a finely-divided particulate additive having an average particle size in the range 2 to 10 μm together with 0.1 to 1% by weight based on the weight of the second linear polyester of a smaller-sized finely-divided particulate additive having an average particle size in the range 0.005 to 1.8 μm dispersed substantially uniformly throughout the secondary layer. The term "average particle size" used in relation to the smaller-sized particles refers to the primary non-agglomerated particles and has the same meaning and is determined in the same manner as that described above for the larger-sized particles.

Generally, in such a mixture of particles, the amount of the smaller particles exceeds the amount of the larger particles, preferably in a ratio in the range 1.2:1 to 10:1.

The exposed surface of the secondary layer has antiblocking surface protrusions produced by the particulate additive mixture, said surface protrusions comprising at least 50 protrusion peaks per $mm^2$ of surface having a peak height of at least 0.4 μm measured from the surface of the polymer (i.e. the mean level of the bases of the troughs between the dispersed particles) and preferably less than 50 protrusion peaks per $mm^2$ of surface having a peak height of more than 1 μm measured in the same way. Such film composites may be produced by any of the processes described above.

The small-sized particles may be chosen from those particulate additives described above for use as the larger particles.

The mixture of particles preferably comprises small and large particles of the same chemical nature. In particular particles having a refractive index comparable with that of the primary layer are preferred, especially silica particles. Spherical particles provide acceptable handling properties.

The mixture of particles is desirably formed by admixing two different sources of particulate additives, for example, during the polymerisation of the second linear polyester or by blending two masterbatches of the second linear polyester containing particles of different average particle sizes.

An admixture of 0.04 to 0.15% by weight based upon the weight of the second linear polyester of large particles having an average particle size in the range 2.5 to 7.5 μm and 0.15 to 0.3% by weight based upon the weight of the second linear polyester of small particles having an average particle size in the range 0.5 to 1.5 μm is especially effective. Preferably the large particles have a size distribution in which the size of 10% by weight of the particles (i.e. the upper decile) exceeds 5 μm and for the small particles the size of 10% by weight of the particles exceeds 1 μm. Such composite films, such as those having a secondary layer comprising a copolyester of 70 to 85 mole % ethylene terephthalate and 30 to 15 mole % ethylene isophthalate, typically have the following combination of properties:

Number of protrusion peaks having a peak height in the range 1 to 3 μm=20 to 50 per $mm^2$ and in the range 0.4 to 0.6 μm=200 to 600 per $mm^2$.

Optical clarity: 5% to 15%.

Static coefficient of friction of secondary layer measured against itself: 0.5 to 2.0.

Heat-seal strength measured by sealing the secondary layer to itself: 85 to 120 $N/mm^2$.

In this specification the following test methods have been used to determine certain properties of the film composites:

The heat-seal strength was measured by sealing the secondary layer to itself or to the primary layer at 140° C. for 0.5 second under a pressure of 103 kPa (15 psi), cooling to room temperature, and measuring the force required under linear tension per unit width of seal to peel the sealed films apart at a constant speed of 5.08 mm/second. To facilitate comparison of the heat-seal strengths tabulated below in the examples the values are quoted as the heat-seal strength for a film composite wherein the secondary layer comprises 20% of the total composite thickness.

The static coefficient of friction of the secondary layer was measured against itself or against the primary layer by the procedure B of ASTM test D 1894-73 with the modifications that (a) the film was not wrapped around the sled but loaded by placing the sled over it and moving the sled and film by means of a multi-strand copper wire attached directly to the film or sheet, (b) the sled which was the same as that specified in ASTM test D 1894-73 was further loaded by the addition of a 1 kg weight and (c) the loaded sled and film were moved at a uniform speed of 20 cm/minute.

The blocking test was effected by pressing the test surfaces together at a pressure of 43 $g/cm^2$ and 38° C. for 3 hours. A test sample of the blocked material, 75 mm wide, was cut and the maximum linear force per unit width required to peel the two film composites apart was determined. Lower forces indicate a greater resistance to blocking.

Optical clarity was determined as the percentage of transmitted light which deviates from the normal to the film surface by an amount in the range 6' to 2° of arc during passage through the film essentially according to ASTM test D 1003-61.

The invention is further illustrated by the following examples.

EXAMPLES 1 AND 2 AND COMPARATIVE EXAMPLES A TO C

Film composites comprising polyethylene terephthalate as the first linear polyester in the primary layer and one secondary layer comprising, as the second linear polyester, a copolyester of 82 mole % ethylene terephthalate/18 mole % ethylene isophthalate were prepared.

The first and second linear polyesters were prepared using a conventional process comprising direct esterification of ethylene glycol with an acid (i.e. terephthalic acid in the case of the first linear polyester or a mixture of 82 mole % terephthalic acid and 18 mole % isophthalic acid in the case of the secondary linear polyester) followed by polycondensation. After terminating the polycondensation, the polymer was cut into small granules suitable for extrusion.

In the case of the Comparative Examples A and B, no particulate additive was added to the second linear polyester, but in the case of Examples 1 and 2 spherical silica particles were incorporated in the second linear polyester by addition to the ingredients for the direct esterification process. Comparative Example C relates to a film composite wherein spherical silica particles were included in the secondary layer but not providing the minimum protrusion surface concentration according to the invention.

Film composites were produced from the first and second linear polyesters by a process of single channel coextrusion wherein streams of the first and second linear polyesters supplied by separate extruders were united in a tube leading to the manifold of an extrusion die and were extruded simultaneously through the die under conditions of streamline flow and without intermixing. The film composite emerging from the extrusion die was quenched immediately upon a water-cooled rotating metal drum having a polished surface and stretched to 3.6 times its original dimension in the direction of extrusion at a temperature of about 90° C. The longitudinally stretched film was then stretched transversely in a stenter oven to 4.2 times its original dimension at a temperature of about 100° C. The film composite was finally heat set under dimensional restraint in a stenter oven at a temperature of about 225° C.

The resulting film composites consisted of a biaxially oriented and heat-set polyethylene terephthalate primary layer and an amorphous copolyester layer of the nature shown in Table 1 and having the properties shown in Table 2. It will be seen that the handling properties, as represented by the tests for blocking and static coefficient of friction, of the film composites of Examples 1 and 2 are generally better than those of the film composite of Comparative Examples A to C.

EXAMPLES 3 TO 5

Film composites comprising polyethylene terephthalate as the first linear polyester in the primary layer and one secondary layer comprising, as the second linear polyester, a copolyester of 82 mole % ethylene terephthalate/18 mole % ethylene isophthalate were prepared and a mixture of large- and small-sized spherical silica particles as shown in Table 1 were produced in accordance with the general procedure described in relation to Examples 1 and 2 and Comparative Examples A to C.

The properties of the film composites are shown in Table 2 wherein the film composites of Examples 3 to 5 provide a superior combination of heat-seal, handling and clarity properties compared with the film composites of Comparative Examples A to C. Such properties are also generally better than those exhibited by Examples 1 and 2 relating to composites containing large particles only in the secondary layer. The film composites of Examples 3 to 5 have acceptable clarity and heat-seal strengths generally of the order of the heat-seal strength of the film composite of Comparative Examples A and B and better than that of Examples 1 and 2 and Comparative Example C. It is the lower area concentration of surface protrusion peaks of at least 1 μm that gives better clarity and heat-seal strength.

TABLE 1

| | Particulate additive in secondary layer | | | | |
| | % by weight based on weight of second polyester | Particle Size by weight | | Thickness of secondary layer μm | Overall thickness of film composite μm |
| Example | | Median | Upper decile | | |
| --- | --- | --- | --- | --- | --- |
| Comparative A | None | None | None | 4.01 | 20 |
| Comparative B | None | None | None | 2.47 | 15 |
| Comparative C | 'Gasil' HP21 0.25 | 1 μm | 1.5 μm | 3.65 | 15 |
| 1 | 'Gasil' 35 0.25 | 3 μm | 5 μm | 2.25 | 15 |
| 2 | 'Syloid' 74 0.25 | 5 μm | 8 μm | 3.75 | 15 |
| | mixture | | | | |
| 3 | 'Gasil' HP21 0.25 | 1 μm | 1.5 μm | 2.87 | 20 |
| | 'Syloid' 74 0.05 | 5 μm | 8 μm | | |
| | mixture | | | | |
| 4 | 'Gasil' HP21 0.25 | 1 μm | 1.5 μm | 2.92 | 20 |
| | 'Syloid' 74 0.01 | 5 μm | 8 μm | | |
| | mixture | | | | |
| 5 | 'Gasil' HP21 0.2 | 1 μm | 1.5 μm | 2.98 | 20 |
| | 'Gasil' 35 0.1 | 3 μm | 5 μm | | |

TABLE 2

| | Number of surface protrusion peaks of | | Heat-seal strength N/m | | Static coefficient of friction | | Blocking test N/m | | |
| Ex. | at least 1 μm per mm² | at least 0.4 μm per mm² | Tested secondary layer to itself | Tested secondary layer to primary layer | Tested secondary layer to itself | Tested secondary layer to primary layer | Tested secondary layer to itself | Tested secondary layer to primary layer | Optical clarity |
| --- | --- | --- | --- | --- | --- | --- | --- | --- | --- |
| Comp. A | 0 | 5 | 121 | 53 | 10.5 | 0.48 | 4.2 | 0.9 | 2.0 |
| Comp. B | 0 | 5 | 103 | 71 | 6.81 | 0.58 | 5.1 | 1.7 | 4.5 |
| Comp. C | 0 | 10 | 92 | 56 | 0.57 | 0.41 | 1.1 | 0.5 | 7.3 |
| 1 | 50 | 260 | 65 | 35 | 0.45 | 0.49 | 0 | 1.3 | 22.5 |
| 2 | 100 | 320 | 54 | 13 | 0.41 | 0.43 | 0.8 | 0.3 | 41.5 |
| 3 | 20 | 485 | 91 | 48 | 0.70 | 0.54 | 0.7 | 0.4 | 13.5 |
| 4 | 5 | 380 | 107 | 54 | 1.23 | 0.58 | 1.4 | 0.3 | 10.0 |
| 5 | 15 | 255 | 113 | 62 | 0.76 | 0.44 | 0 | 0.3 | 13.0 |

I claim:

1. A polyester film composite, which comprises a primary layer comprising a highly crystalline molecularly oriented layer of a first linear polyester and a heat-sealable secondary layer adherent to the primary layer, said second layer consisting essentially of an essentially amorphous second linear polyester containing from 0.005 to 0.2% by weight based upon the weight of the second linear polyester of a finely-divided particulate additive having an average particle size in the range 2 to 10 μm together with 0.1 to 1% based on the weight of the second linear polyester of smaller finely-divided particles having an average particle in the range 0.005 to 1.8 μm dispersed substantially uniform throughout the secondary layer.

2. A film composite according to claim 1, in which the secondary layer comprises at least 50 protrusion peaks per mm² of surface having a peak height of at least 0.4 μm.

3. A film composite according to claim 1, in which the secondary layer comprises less than 50 protrusion peaks per mm² of surface having a peak height of more than 1 μm.

4. A film composite according to claim 1, in which the particle admixture in the secondary layer comprises 0.04 to 0.15% by weight of particles having an average particle size in the range 2.5 to 7.5 μm and 0.15 to 0.3% by weight of particles having an average particle size in the range 0.5 to 1.5 μm.

5. A film composite according to claim 1, having an optical clarity in the range 5% to 15% and in which the secondary layer tested against itself has a static coefficient of friction in the range 0.5 to 2.0 and a heat-seal strength in the range 85 to 120 N/mm².

6. A film composite according to claim 1, in which the first linear polyester comprises a biaxially oriented and heat-set crystalline polyethylene terephthalate layer and the second linear polyester comprises an amorphous copolyester of 60 to 90 mole % ethylene terephthalate and correspondingly 40 to 10 mole % ethylene isophthalate.

* * * * *